United States Patent [19]
Taniguchi et al.

[11] 3,995,256
[45] Nov. 30, 1976

[54] SELECTIVE SWITCHING CIRCUIT

[75] Inventors: Tadasu Taniguchi, Tokyo; Iwao Hosaka; Shigeru Yoshida, both of Chichibu, all of Japan

[73] Assignee: Canon Kabushiki Kaisha, Tokyo, Japan

[22] Filed: Sept. 27, 1974

[21] Appl. No.: 509,849

[30] Foreign Application Priority Data

Sept. 29, 1973 Japan.............................. 48-109855

[52] U.S. Cl.................................. 340/172.5; 360/2
[51] Int. Cl.²...................... G06K 1/12; G11C 19/00
[58] Field of Search ......... 340/172.5, 365 S, 149 A; 235/92 NG, 92 DP, 92 ST, 92 SH, 92 DE; 360/2, 4

[56] References Cited
UNITED STATES PATENTS

| | | | |
|---|---|---|---|
| 3,471,862 | 10/1969 | Barney..................... | 360/4 |
| 3,483,553 | 12/1969 | Blankenbaker............... | 340/365 S |
| 3,560,715 | 2/1971 | Akamatsu et al............ | 340/149 A X |
| 3,611,299 | 10/1971 | Lindsey et al.............. | 340/172.5 |
| 3,656,122 | 4/1972 | Pasternack................. | 235/92 NG X |
| 3,662,343 | 5/1972 | Goldstein et al............ | 340/149 A |
| 3,662,362 | 5/1972 | Arciprete et al............ | 360/2 |
| 3,733,471 | 5/1973 | Gilberg.................... | 235/92 NG X |
| 3,787,875 | 1/1974 | Gechele et al.............. | 360/2 |

*Primary Examiner*—Melvin B. Chapnick
*Attorney, Agent, or Firm*—Fitzpatrick, Cella, Harper & Scinto

[57] ABSTRACT

A selective switching circuit which is operative to successively switch a plurality of other circuits, one at a time in a predetermined order, into an existing circuit configuration. An embodiment of the invention is described in relation to a magnetic strip card writing device, whereby information to be written on each of a plurality of strips is successively stored in corresponding registers, and later applied to the strips all at one time. Information in any of the registers may be preserved therein, with new information to be recorded being directed into the next ordered register.

11 Claims, 6 Drawing Figures

SELECTIVE SWITCHING CIRCUIT

BACKGROUND OF THE INVENTION

1. Field of the Invention

This invention relates to circuits for selecting a plurality of other electric circuits and, particularly, to a circuit for successively selecting a plurality of other electric circuits. More specifically, the invention relates to a circuit for skipping past a specific one of a plurality of other electric circuits to thereby successively select the next circuit in a predetermined order.

2. Description of the Prior Art

In a method conventionally used to select a plurality of electric circuits, an independent switch is employed for each of those electric circuits as described. Where each of the switches is independently provided as previously mentioned, however, it is necessary to discriminate which switch should be actuated whenever a selection is to take place, even if electric circuits are selected in a predetermined order.

SUMMARY OF THE INVENTION

The present invention overcomes the limitations noted above with respect to the prior arts.

It is an object of this invention to provide a simply constructed circuit which can successively select a plurality of electric circuits in an uncomplicated manner.

It is a further object of this invention to provide a simply constructed circuit which can skip past the selection of a particular electric circuit in a simple manner whenever a plurality of electric circuits is successively selected.

It is another object of this invention to provide a simply constructed circuit which can easily detect whether a plurality of electric circuits is to be successively selected or particular electric circuits are to be skipped and then other circuits successively selected.

It is yet another object of this invention to provide an information write device which comprises a simple circuit and which is simple in operation.

These and other objects and effects of the invention will become more apparent upon a reading of the following description and drawings, in which:

DESCRIPTION OF THE PREFERRED EMBODIMENTS

Cards such as account cards in banks, credit cards, member cards in golf clubs, etc. are widely used to record thereon various information. In these cards, usually, one card has a plurality of information recorded thereon. For example, on the bank account card there is recorded information such as the name of the bank, name of the branch office of the bank by which the card is issued the kind of account, account number, code adapted to specify a person who holds the card, etc. In such an information write device wherein information is written on the card, information (such as name of bank, name of branch office of bank, etc.) common to all cards is often written so that it may be desirable that information common to all cards is not received as input whenever the card is issued, but is pre-stored in the information write device.

The present invention provides improved operation if it is desired to store such information common to all cards as previously mentioned in the information write device.

The circuit of the present invention will now be described by way of a preferred embodiment representative of the information write device as noted above.

Figure 1:
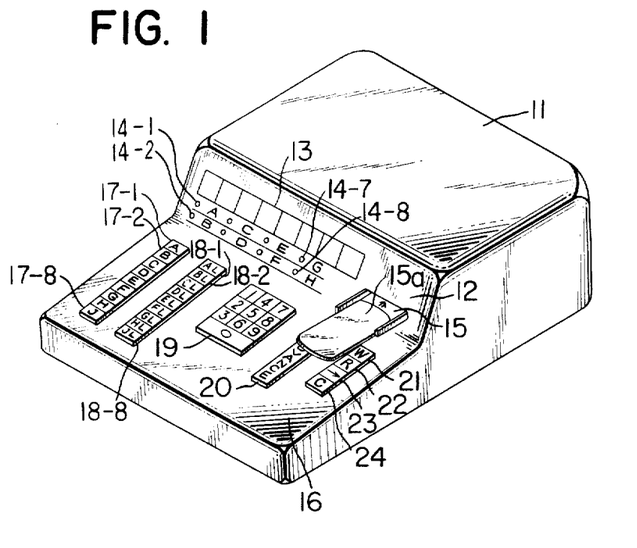
FIG. 1 is an exterior perspective view of an information write device including therein a selector circuit in accordance with the present invention.

FIG. 1 is a perspective view of an information write device to which a selector circuit according to the present invention is applied. A casing 11 has a portion provided with a front panel 12, which comprises a numeric indicator 13 of eight figures, indicator lamps 14-1 to 14-8 (hereinafter collectively referred to as "14") indicative of input information, and an aperture 15 through which a card 15a is admitted. On an operating panel 16 are disposed selective switches 17-1 to 17-8 and fixed switches 18-1 to 18-8. The selective switch 17 is a switch of the type which is in ON position only while it is being depressed, and is for the purpose of indicating a destination for input data taken in by numeric keys 19 after they have been depressed, said numeric keys 19 being disposed on the panel for the purpose of inputting numerics 0 to 9. Since the selective key 17 depressing order may not be specifically fixed, the keys may be depressed in any order. For example, the numeric keys 19 are first depressed in the order of 1-4-7, and then the selective switch key 17-1 is depressed, after which the numeric keys 19 are depressed in the order of 2-5-8 and then the selective switch key 17-2 is depressed, or thereafter any one of selective switch keys 17-2 to 17-8 may be depressed. Thus, it is not required that the switches 17 be depressed in the order of 17-1, 17-2, . . . . 17-8. Accordingly, it is noted that input information may be stored, by depression of keys in any order, corresponding to individual selective switch 17. The fixed switch 18 as mentioned above is a switch disposed to correspond to the selective switch keys 17, and in its normal state a first contact member is held in contact with a second contact, and in a non-normal state with the fixed switch 18 depressed, the switch 18 is such that the first contact member is placed in contact with a third contact, and when the switch 18 is further depressed, it returns to its normal state. By placing the fixed switch 18 in non-normal state, information selected by the selective switch keys 17 corresponding to the fixed switch 18 may be held indestructive.

A progressive key is designated as 20, actuation of which substitutes for the successive depression of selective keys 17-1 to 17-8 in numerical order, and is placed in ON position only when it is depressed. After information has been taken in by the numeric keys 19, the progressive key 20 is depressed once instead of depressing the selective switch key 17-1. Information is again taken in by the numeric keys 19, after which the progressive key 20 is again depressed to thereby perform a function similar to that obtained when the selective switch 17-2 is depressed. Assume now that a certain fixed switch 18 (for example, 18-3) is in a non-normal state. Assume further that the progressive key 20 is depressed after the numeric key 19 has been depressed, this operation being repeated twice. If thereafter the numeric key 19 is further operated and key 20 depressed once again a, similar function to that of selective switch 17-4 being depressed may be performed, even through ordinarily a similar function corresponding to the selective switch 17-3 being depressed should be performed. In other words, where a fixed switch 18$n$ is in a non-normal state, successive depressions of the progressive key 20 will not permit a function corresponding to depression of a corresponding key 17-$n$ to be performed.

In FIG. 1, the reference numeral 21 designates a write switch adapted to apply that input information, which has been taken in with the use of the numeric keys 19, the selective switch keys 17, the fixed switch keys 18, and the progressive key 20, to the card 15$a$ by magnetically driving the same. Numeral 22 designates a read-out switch adapted to instruct that information on the card is read-out. Numeral 23 designates a shift key used to correct input information when taken in, and numeral 24 designates a clear key adapted to clear stored elements within the write device.

Figures 2, 2B:
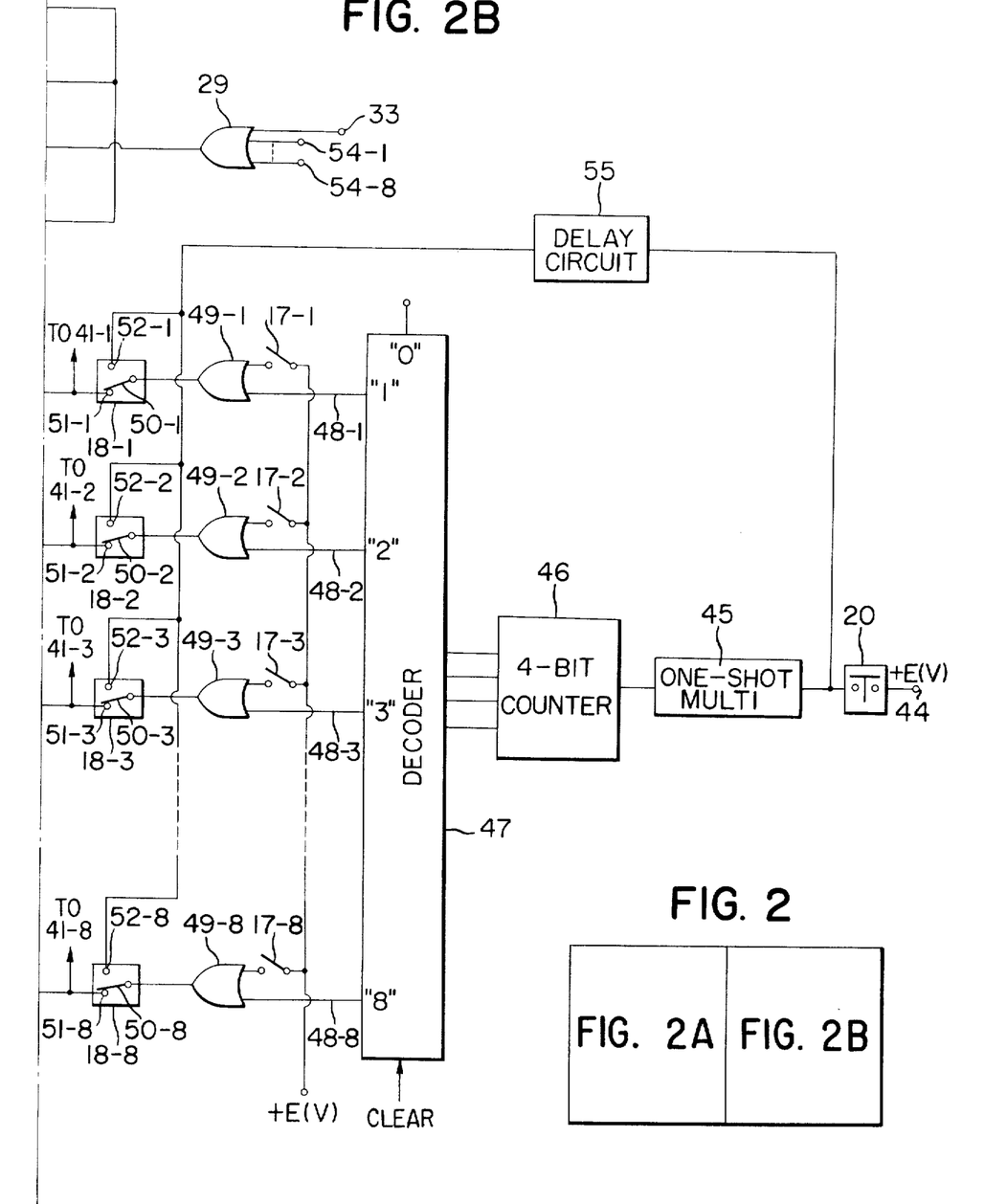
FIGS. 2A and 2B together are a block diagram of electric circuitry showing a principal part of the information write device illustrated in FIG. 1.
Figure 2A:
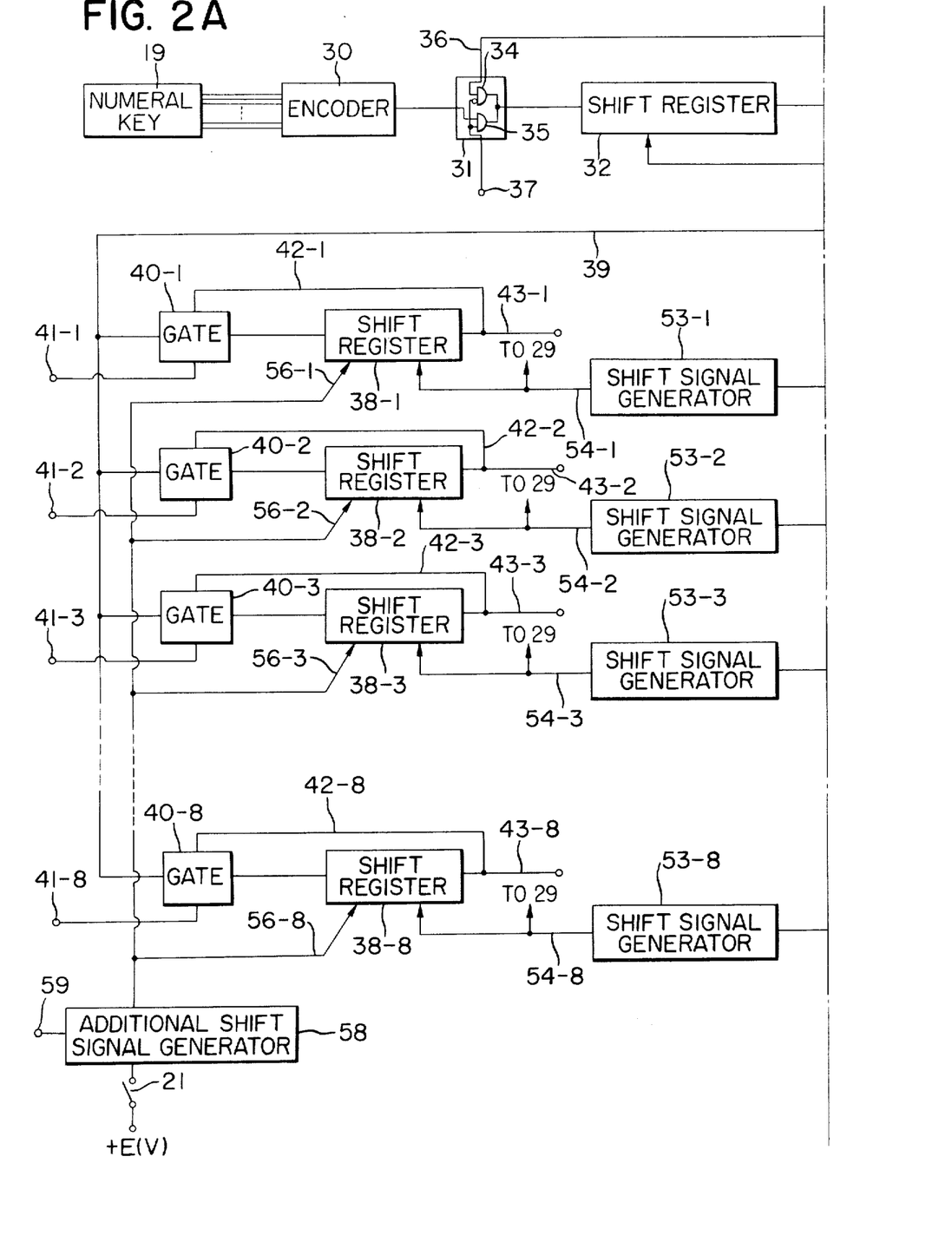

In describing the invention in detail, reference will be made to FIGS. 2A and 2B, a block diagram showing the construction of the information write device of FIG. 1, in which like reference characters designate corresponding parts in FIG. 1. There is shown the numeral keys 19 as hereinbefore described, and an output of the numeral key 19 is converted into a binary-coded 4-bit signal by an encoder 30 and then applied through a gate 31 to a register 32 of thirty two stages having flip-flops cascade connected. The gate 31 consists of two "and" gates 34 and 35. The "and" gate 34 has one input connected to an output line 36 of the register 32 and the other input connected through an inverter to a terminal 37. The "and" gate 35 has one input to which the output of the encoder 30 is applied, and the other input connected to the terminal 37. These two "and" gates have their outputs connected to the input of the register 32. From this construction, upon application of shift pulses the register 32 is shifted in accordance with the number of pulses applied and, when application of shift pulses is stopped, the register 32 keeps its storage condition. Accordingly, when the numeral keys 19 are successively depressed, the register 32 receives numeric information in a certain number of stages, and when the shift pulses are applied from the terminal 33 of an "or" gate 29, the numerics may be successively received in the register 32. As just mentioned, therefore, when information is taken in by the numeral keys 19 into the register 32 and a signal of high level is applied through the terminal 37, there is obtained a state where the signal may pass through the "and" gate 35 but not pass through the gate 34, to thereby present a write mode that numeric information is successively received in the register 32. Conversely, when application of the high level signal applied to the terminal 37 is stopped, there is obtained a state where the signal may pass through the "and" gate 34 but not pass through the "and" gate 35. From this, shift pulses are applied to the register 32 to thereby present a circulation mode so that information within the register may be circulated through the output line 36.

The output of the register 32 is applied through a transfer line 39 to gates 40-1 to 40-8. The gates 40-1 to 40-8 are connected to registers 38-1 to 38-8, respectively. The gate 40 and register 38 are constructed similarly to that of the aforementioned gate 31 and register 32. The register 38 may be selected by a signal applied to the terminal 41 so as to assume either write mode or transfer mode, and the information conveyed through the transfer line 39 and written in the respective registers 38-1 to 38-8 may be controlled. The registers 38-1 to 38-8 have output lines 42-1 to 42-8 similar to the above-described register 32 and further have output terminals 43-1 to 43-8. The reference numeral 20 designates the progressive key, as hereinbefore described, which is a switch of the type which is placed in ON position when it is depressed. When the switch 20 is depressed, a voltage of positive E(V) applied to the terminal 44 may be applied in the form of a pulse signal to a one-shot multivibrator 45 located at a next stage through a differential circuit or the like, not shown, included in the switch 20. A binary-coded 4-bit counter as indicted by 46 is driven by the leading edge of the pulse signal generated by the multivibrator 45, and the output of the counted 46 being applied to a decoder 47 through four output lines. This decoder is to decode binary-coded 4-bit signals to impart outputs to corresponding decoder output lines 48-1 to 48-8. Consequently, in a state where the progressive key 20 is not depressed or in a state of "0", output is not obtained from the decoder output lines 48. When the key 20 is depressed once, the decoder output "1" is obtained to thereby obtain an output on the output line 48-1, and when the progressive key 20 is depressed once again, the decoder output "2" is obtained to thereby obtain an output on the decoder output line 48-2. In this way, output signals on the decoder output lines 48 are successively displaced according to the number of depressions of the progressive key 20. The output of the decoder output line 48 is applied to "or" gates 49-1 to 49-8. The "or" gate 49 has its other end connected to a source of positive potential E(V) through the aforementioned selective switch 17. The "or" gate 49 has its output connected to a contact member 50 of the fixed switch 18 which has either one of contacts 51 and 52 in contact with the contacts members 50. The contact 52 are connected in common and are connected to the input terminal of the one-shot multivibrator 45 through a delay circuit 55 including a delay portion and a differential portion adapted to differentiate a delayed signal, while the contacts 51 are applied to respective shift signal generators 53 and connected to the terminals 41 of the corresponding gates 40. The fixed switch 18 is a switch of the type in which in its normal state maintains the contact member 50 in contact with the contact 51 as shown in the drawing, and when the switch is depressed, the contact member 50 is placed in contact with the contact 51. When the switch is depressed once again, the fixed switch 18 is returned to its normal condition.

When the signal is applied to the shift signal generator 53 from the contact 51 of the fixed switch 18, the generator 53 generates shift pulses, by which the registers 32 and 38 are shifted through eight figures with four stages for each figure, thus requiring a total of 32 shift pulses.

Figure 3:
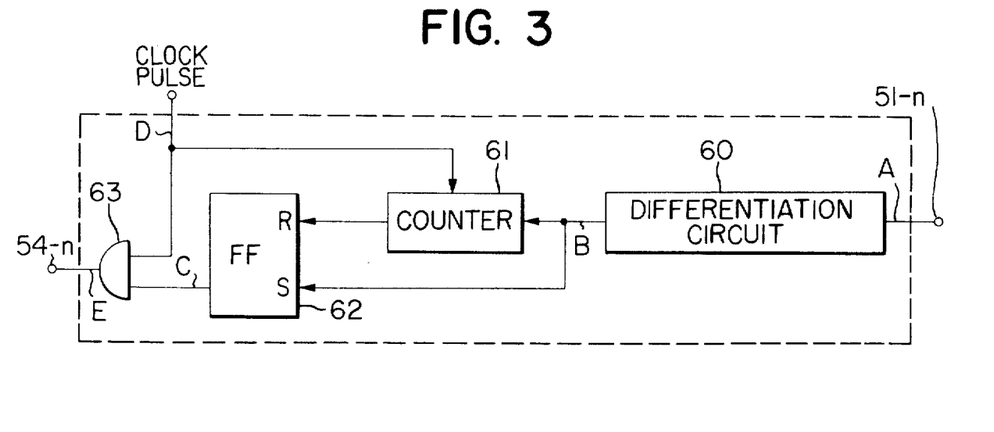
FIG. 3 is a block diagram showing a further detailed shift signal generator in FIG. 2.
Figure 4:
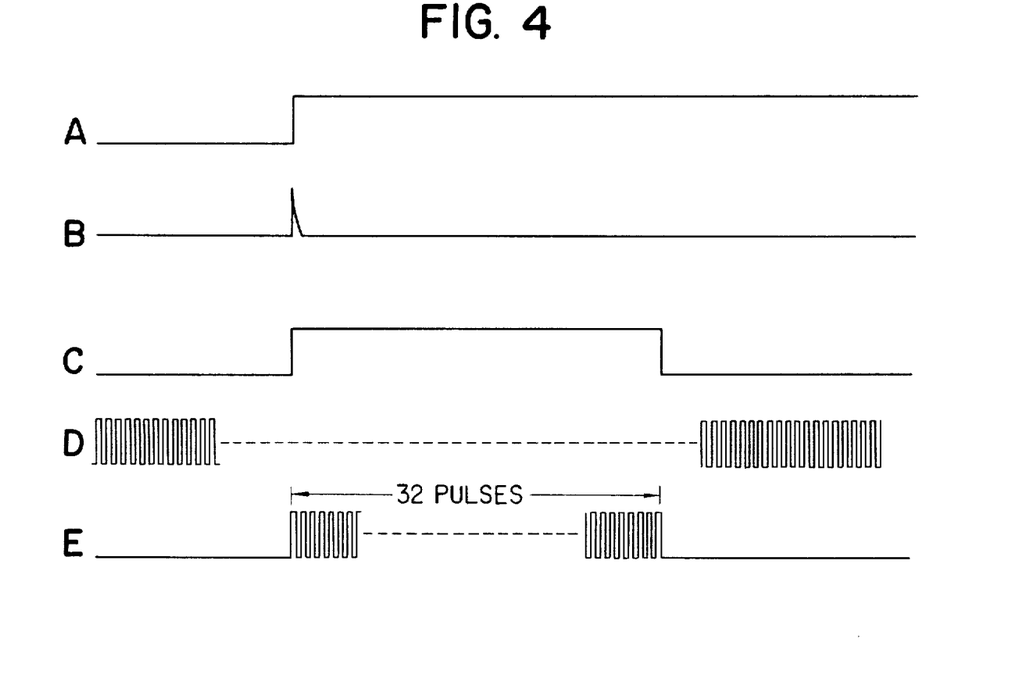
FIG. 4 shows waveforms of assistance in explaining the operation in connection with FIG. 3.

Referring now to FIGS. 3 and 4, a preferred embodiment of the shift signal generator 53 and the operation thereof will be described in detail. A differentiation circuit is indicated by 60, and when a signal having a waveform as shown in FIG. 4(A) is applied by the contact 51, a differential signal having a waveform as shown in FIG. 4(B) is formed at the leading edge of the above signal. This differential signal is applied in the form of a count start trigger signal to a counter 61 and is applied in the form of a set input to a flip-flop 62. Since the counter 61 is being supplied with clock pulses, the counter counts the clock pulses after the above-described differential signal has been applied. Further, since outputs from the counter corresponding to a 32 count are connected to the reset input of the aforementioned flip-flop, the flip-flop 62 provides, from its set output terminal, output for a period equal to the time at which 32 clock pulses having a waveform as shown in FIG. 4(C) are generated. Thus, by application of the set output of the flip-flop 62 and the clock pulse (shown in FIG. 4(D) from a clock pulse generator, not shown, having oscillation frequencies of 100 KHz into the "and" gate 63, 32 clock pulse signals as shown in FIG. 4(E) may be obtained by the "and" gate 63. The clock pulses thus obtained are applied in the form of a shift signal to a respective corresponding register 38 and "or" gate 29. As a result, assume that all of the fixed switches 18 are in a normal condition. When a suitable selective switch 17 is turned "ON", the voltage + E(V) (high level signal) is applied to the shift signal generator 53 through the "or" gate 49, the contact member 50, and the contact 51. If the shift signal generator 53 is designed so that shift pulses (4 × 8 = 32 shift pulses) in the number required to shift all of the contents in the registers 32 and 38 may be applied, the content in the register 32 is transferred to the register 38 corresponding to that selective switch key 17 which is in an ON position.

Figure 5:
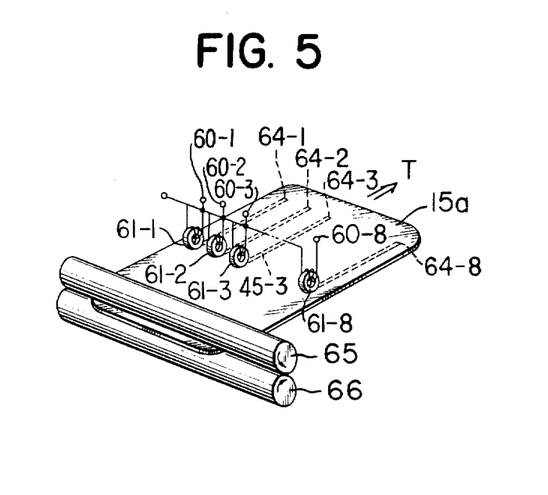
FIG. 5 illustrates a state in which information is written on a card.

The register 38 has shift signal applying lines 56-1 to 56-8 connected in common, which are connected to an output terminal of a second (additional) shift signal generator 58. This second shift signal generator 58 has its input terminal connected to the aforementioned write switch 21 with one end connected to the potential source of + E (V), and a terminal 59 to which a shift pulse having frequencies (1 KHz) corresponding to 1/100 the frequency of the aforementioned pulses. The second shift signal generator 58 is a circuit which provides shift pulses in the number required to completely shift the contents in the shift register 38, and the circuit may be in the same form as that of the aforementioned shift signal generator 53. The shift register 38 has output lines 43-1 to 43-8 which, after passing through unshown amplification circuits and a waveform shaping circuits, connect to coil terminals 60-1 to 60-8, respectively, of magnetic heads 61-1 to 61-8, as shown in FIG. 5, encased in the casing 11. With this construction, when the write switch 21 is depressed and turned ON, rollers 65 and 66 are rotated by a motor, not shown, in the direction as indicated by the arrows in FIG. 5, whereby the card 15a is transported at a constant speed in the direction indicated by the arrow T. At the same time, a shift pulse having a very small frequency, that is, 1 KHz, is applied to the shift registers 38, the contents of which are then read out at a low speed and successively conveyed to the magnetic 61. From there, the contents of the shift registers 38 are simultaneously written on the magnetic bodies 64 on the card 15a transported by the rollers 65 and 66, the bodies 64 being in intimate contacting relationship with the magnetic head 61.

The circuit of the present invention is constructed as described above, however the operation thereof will be hereinafter described in detail.

Assuming now that the information to be written on the card includes the name of a bank, the name of a branch office of the bank, an account number, kind of account, and an individual discriminating code, the information being five in kind, and further assuming that the name of the bank must be written on a track 64-1 on the card 15a, the name of branch office of the bank on a track 64-2, the account number on a track 64-3, the kind of account on a track 64-4, and the code on a track 64-5, then the name of bank must be received in the register 38-1, the name of branch office of the bank in the register 38-2, the account number in the register 38-3, the kind of account in the register 38-4, and the code in the register 38-5. In this arrangement, information consisting of the numerical name of the bank (a specific numeric is predetermined to each bank) is first applied by the numeral input keys 19 into the shift register 32, after which the selective switch 17-1 is depressed (in this case, all of the fixed switches 18 are in a normal state) to thereby form the gate 40-1 with a write mode, and at the same time 32 shift pulses are applied from the shift signal generator 53-1 to the register 32 and register 38-1, whereby the numerical name of bank is received in the register 38-1. Thereafter, similar steps of process of the above may be taken, that is, after the numerical name of branch office of the bank has been taken in by the numeral keys 19, the selective switch 17-2 is turned ON, the information obtained therefrom is received in the register 38-2. In a similar way, if the selective switches 17-3, 17-4, and 17-5 are successively depressed whenever the information is taken in by the numeral keys 19 in order as previously mentioned, predetermined information may be received in a predetermined register. Thus, when the write switch 21 is driven after all of the information as required has been taken in, the information may be recorded on the card as previously mentioned so that a complete card may be prepared. As is apparent from the foregoing, when the selective switch keys 17 are driven, the contents of the register 32 may be transferred into the registers 38 associated with the driven selective switch keys 17. In this case, however, the switches must be depressed five times when selecting the individual associated switches, which entails complicated operation.

The progressive key 20 is provided to obviate the complicated operation as noted above, and the key 20 is actuated in place of successively depressing the selective switches 17-1 to 17-5 as previously mentioned. That is to say, if the progressive key 20 is depressed once after the information consisting of the numerical name of bank has been received in the register 32, an output may be obtained from the decoder output line 48-1 which creates an output from the "or" gate 49-1, thus obtaining a signal equivalent to that obtained by driving the selective switch 17-1. Then, if the progressive key 20 is depressed after the information corresponding to the numerical name of the branch office of the bank has been received in the register 32, the information may be transferred to the register 38-2. Thus, in operation with the use of the progressive key 20, the registers 38 may successively be selected in a predetermined order by merely depressing the same key, and for this reason the operation becomes simpler than that required when using the selective switch keys 17.

Operation of the fixed switches 18 is as follows. This fixed switch is provided to preserve information received in the corresponding registers 38. After the information has been received in the register 38 which desires preservation, the fixed switch 18 corresponding to the register 38 can be placed in a non-normal state. For example, where the content stored in the register 38-1, i.e., the name of the bank, is used for a plurality of cards in common, the numeral keys 19 and the selective switch 17-1 or the progressive key 20 are used to receive the information concerning the name of bank into the register 38-1, after which the fixed switch 18-1 is depressed so that the contact member 50-1 is placed in contact with the contact 52-1. Thus, the switch 18-1 comes into a non-normal state to thereby remove the high level signal to the terminal 41-1, and the gate 40-1 is changed into a circulation mode so that information transfer along line 39 to the register 38-1 is interrupted. Consequently, even if a shift pulse is applied to the register, the information within the register is merely appears on the output line 42-1 and is held in circulating fashion. From the above, it will be apparent that with the fixed switch 18-1 driven in a nonnormal state, even if the selective switch 17-1 has erroneously been depressed instead of the selective switch 17-2 to transfer contents of the register 32 to the register 38-2, the register 38-1 is not affected at all, so that the switch 17-2 may be properly depressed thereafter.

As hereinabove described, when the fixed switch is placed in a non-normal state, the gate 40 comes into a circulation mode so that, even after shift pulses is applied from the shift signal generator 58 to the read-out signal lines 56 of the registers 38 to write the information of the registers 38 on the card 15a, the information is still preserved (it is noted that the counter 46 is cleared by driving the write switch 21). In such a state, when new information for a new card is desired to be written in the registers 38-2 to 38-5 (assuming, in this case, that only the content of the register 38-1 is used without being modified), the progressive key 20 may merely be depressed after the information to be received in the register 38-2 has been received in the register 32 by the numeral keys 19. With this, an output may be obtained by the decoder output line 48-1 but the contact member 50-1 is in contact with the contact 52-1, so that the decoder output is not applied to the lift signal generator 53-1 but applied to the one-shot multivibrator 45 after passing through the delay circuit 55. Then, the output of the one-shot multivibrator 45 is applied to the counter 46 causing the counter 46 to effect another count up, whereby an output may be obtained from the decoder output line 48-2 to transfer the information of the register 32 to the register 38-2.

From the foregoing, it will be appreciated that if a certain one of the fixed switches 18 is in a non-normal state when the progressive key 20 is depressed, the register 38 corresponding to the fixed switch 18 is not selected but the next register 38 having a corresponding switch 18 in a normal state is selected.

We claim:

1. A device for recording information on a recording medium comprising:

information supply means for supplying binary-coded information;

first storage means coupled to said supply means for storing the binary-coded information;

a plurality of second storage means for storing the binary-coded information first stored in said first storage means;

a plurality of gates coupled between said first storage means and respective ones of said plurality of second storage means, for transferring information from said first storage means to said plurality of second storage means when said respective gates are opened, each of said gates being operative to open in response to control signals selectively applied thereto;

control means coupled to said gates for generating said control signals, said control means comprising a switch, means for producing a signal in response to actuation of the switch, and counting means operative in response to said switch signal for producing said control signals in accordance with the counted number of said switch signals;

means for recording information stored in said plurality of second storage means; and write means coupled between said recording means and plurality of second storage means for simultaneously applying the information in said plurality of second storage means to said recording means.

2. A device according to claim 1, further comprising waveform shaping circuit means coupled between said switch and said counting means and being operative to shape said switch signals into corresponding pulse signals and for applying said pulse signals to said counting means.

3. A device according to claim 1, wherein said control means further comprises feedback means for feeding back the output from said counting means to the input of said counting means, and means for switching the outputs from said counting means between said gates and said feedback means so that said counting means continues counting in the absence of said switch signals.

4. A device according to claim 1, wherein said control means further comprises a plurality of selective switch means each coupled to a respective one of said gates for applying a said control signal to the gate independently from said counting means.

5. A selective switching circuit comprising:

a keyboard;

converting means coupled to said keyboard for converting information provided from said keyboard into binary-coded information;

first storage means coupled to said converting means for storing the binary-coded information obtained from said converting means;

a plurality of gate means for transferring the binary-coded information stored in said first storage means in response to control signals selectively applied to each of said gate means;

a plurality of second storage means each coupled to respective ones of said gate means for storing the binary-coded information transferred through said gate means; and control means coupled to said gate means for forming said control signals and for selectively applying said signals to each of said gate means, said control means comprising switching means for producing a pulse signal when actuated, counting means operative in response to the pulse signals for counting the number of the pulse signals and for producing a corresponding output, and decoder means having a plurality of output ports corresponding respectively to each of said gate means and being operative to derive said control signals in accordance with the output of said counting means, for applying the control signals to respective ones of said gates.

6. A selective switching circuit according to claim 5, wherein said control means further comprises a plurality of feedback means each for selectively feeding back the control signals from a respective one of said output ports to the input of said counting means, and a plurality of switch means for switching a corresponding said output port of said decoder means between a respective one of said feedback means and a respective one of said gate means.

7. A selectively switching circuit according to claim 5, wherein said first and second storage means each comprise shift registers.

8. A device for writing information on magnetic material comprising:
   a keyboard;
   input means for generating binary-coded signals in response to actuation of the keyboard;
   a first gate connected with said input means;
   first shift register connected with said first gates for receiving the binary-coded signals;
   a plurality of second shift registers;
   second gates connected between said first shift register and said second shift registers;
   control means connected with each of said second shift registers, said control means being operative to form shift pulses for controlling movement of information within said second shift registers;
   counting means having output terminals connected with said control means and having an input terminal for receiving electrical signals to be counted;
   feedback means connected with selected ones of said output terminals for feeding back signals from said output terminals to said input terminal of said counting means;
   switch means for selectively switching each of said output terminals between said input terminal of said counting means and said second shift registers;
   a magnetic head operative to write said information on said magnetizable material;
   means for applying outputs from said second shift registers to said magnetic head; and
   means for applying a read out shift signal to each of said second shift registers;
   whereby information is loaded from said keyboard into said first register and transferred into said second registers in an order defined by both the output from said counting means and the state of said switch means.

9. A writing device for writing information on a magnetic recording medium comprising:
   information input keys provided on an operation panel;
   converting means coupled to said keys for converting the information provided from said keys into binary-coded signals;
   a first shift register coupled to said converting means being operative to store the binary-coded information produced from said converting means and to read out said information in response to shift pulses applied thereto;
   a plurality of gate means each coupled to said first shift register for transferring the binary-coded information read out from said first shift register in response to control signals selectively applied thereto;
   a plurality of second shift registers each coupled to a respective one of said gate means and being operative to store the binary-coded information which is transferred through said one gate means from said first shift register;
   control means coupled to each of said gate means for forming the control signals, said control means comprising a step key which is provided on the operation panel, pulse signal forming means for forming a pulse signal in response to actuation of said step key, and counting means having an input port and plural output ports, the number of output ports corresponding to the number of said gate means, for counting the pulse signals provided from said pulse signal forming means to the input port and for producing an output on a particular one of the output ports in accordance with the count established therein;
   write means coupled to said second registers for simultaneously reading out the information in said registers; and
   magnetic recording means for recording the information derived from said second shift registers on the magnetic recording medium.

10. A writing device according to claim 9, wherein said control means further comprises feedback means for selectively feeding back each of the output ports of said counting means to the input port of said counting means to permit said counting means to continue counting, and a plurality of jump switch means provided on the operation panel for switching the output ports of said counting means between a respective one of said gate means and said feedback means.

11. A writing device according to claim 10, wherein said control means further comprises logic circuits connected between the output ports of said counting means and each of said jump switch means, each circuit having one of its input ports connected with one of the output ports of said counting means and another input port connected to a signal of predetermined level, and having its output port connected with a respective one of said jump switch means, and a plurality of selector switch means provided on the operation panel for selectively applying said predetermined level signal to said logic circuits.

* * * * *

UNITED STATES PATENT OFFICE
CERTIFICATE OF CORRECTION

Patent No. 3,995,256        Dated November 30, 1976

Inventor(s) TADASU TANIGUCHI, ET AL.

It is certified that error appears in the above-identified patent and that said Letters Patent are hereby corrected as shown below:

Column 1, line 25, change "arts" to --art--;
          line 33, change "is" to --are--;

Column 2, line 1, insert --the-- before "name";
          line 54, insert --a-- before "non-normal".

Column 3, line 8, change "through" to --though--;
          line 10, change "18n" to --18-n--;
          line 34, change "thirty two" to --thirty-two--.

Column 4, line 22, change "counted" to --counter--;

line 51, delete "in" (first occurrence).

Column 5, line 63, insert --heads-- after "magnetic".

Column 6, line 55, insert --the-- before "bank".

Column 7, line 16, change "to" to --from--;
          line 32, change "is" to --are--.

Signed and Sealed this

Fifth Day of April 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,995,256
DATED : November 30, 1976
INVENTOR(S) : TADASU TANIGUCHI, ET AL It is certified that error appears in the above-identified patent and that said Letters Patent are hereby corrected as shown below:

At entry "[30]" on the identification page of the patent change the number of the Japanese Priority Document to read --48-109854--

Column 4, line 43, change "contacts" to --contact--; and change "contact" (second occurrence) to --contacts--

Signed and Sealed this thirtieth Day of August 1977

[SEAL]

Attest:

RUTH C. MASON
*Attesting Officer*

C. MARSHALL DANN
*Commissioner of Patents and Trademarks*